United States Patent [19]

Tominaga et al.

[11] Patent Number: 4,929,061
[45] Date of Patent: May 29, 1990

[54] COLOR LIQUID CRYSTAL DISPLAY DEVICE

[75] Inventors: Mamoru Tominaga, Kawagoe; Naoyuki Kokado; Katsuhiro Gonpei, both of Yokohama; Hisami Nira; Akira Taya, both of Kawasaki, all of Japan

[73] Assignee: Kabushiki Kaisha Toshiba, Kanagawa, Japan

[21] Appl. No.: 215,172

[22] Filed: Jul. 5, 1988

[30] Foreign Application Priority Data

Oct. 29, 1987 [JP] Japan .................. 62-271757

[51] Int. Cl.$^5$ .............................. G02F 1/133
[52] U.S. Cl. .................. 350/338; 350/339 D; 350/339 F; 350/345
[58] Field of Search ............... 350/345, 339 F, 347 V, 350/347 E, 338, 339 D; 358/29

[56] References Cited

U.S. PATENT DOCUMENTS

| | | | |
|---|---|---|---|
| 4,176,294 | 11/1979 | Thornton, Jr. | 313/485 |
| 4,379,292 | 4/1983 | Minato et al. | 358/29 |
| 4,673,253 | 6/1987 | Tanabe et al. | 350/339 F |
| 4,678,285 | 7/1987 | Ohta et al. | 350/339 F |
| 4,793,691 | 12/1988 | Enomoto et al. | 350/345 |
| 4,803,399 | 2/1989 | Ogawa et al. | 350/345 |
| 4,828,365 | 5/1989 | Stewart et al. | 350/339 F |

FOREIGN PATENT DOCUMENTS 0125323 6/1987 Japan .................. 350/339 F

OTHER PUBLICATIONS

"Liquid Crystal Color Displays", T. J. Scheffer, Nonemissive Electrooptic Displays, 1975.
Electronic Materials (Denshi Zairyo); K. Noguchi, Feb., 1986.
National Technical Report; S. Tanaka et al.; vol. 33, No. 1, 1987.

Primary Examiner—Stanley D. Miller
Assistant Examiner—Anita Pellman Gross
Attorney, Agent, or Firm—Finnegan, Henderson, Farabow, Garrett and Dunner

[57] ABSTRACT

A color liquid crystal display device fitted with a liquid crystal panel having a pixel formed with a plurality of primary color pixel components combined so that a reference white is reproduced, each of the primary color pixel components further having a corresponding liquid crystal shutter; and a back light unit disposed in the rear of the liquid crystal panel and used to give light in such a manner as to have the light pass through the liquid crystal shutters. In the color liquid crystal display device, the transmission factors of the liquid crystal shutters corresponding to the primary color pixel components are set substantially equal and the reference white is reproduced on the liquid crystal panel by means of the transmission factors thus set. With this arrangement, it becomes possible to set high the luminance of the reference white, to equalize the gradation levels depending on the primary color and to simplify the configuration of its driving circuit.

9 Claims, 6 Drawing Sheets

FIG. 5(b)
FIG. 5(a)
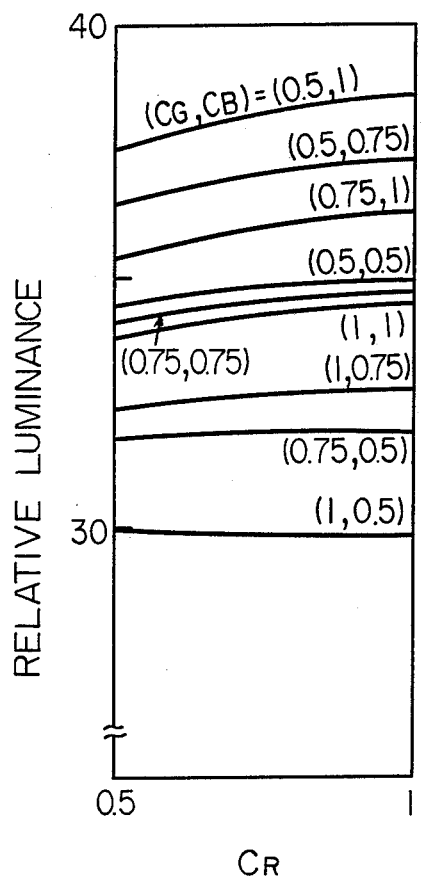
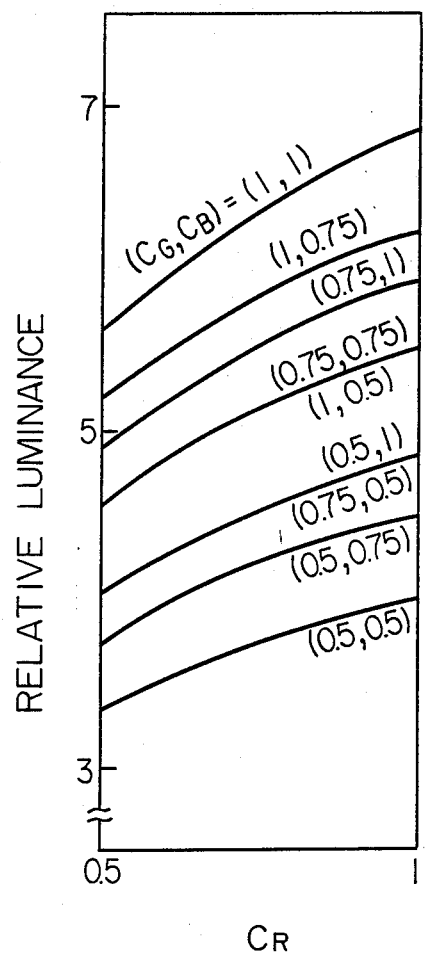

COLOR LIQUID CRYSTAL DISPLAY DEVICE

FIELD OF THE INVENTION

The present invention relates to an improvement in white luminance in a color liquid crystal display device.

As shown in FIG. 12, a color liquid crystal display device comprises, e.g., a liquid crystal panel 12 and a back light unit 14 for illuminating the liquid crystal panel 12 from behind.

FIG. 13 is a typical structural diagram of the liquid crystal panel 12.

The transmittance of liquid crystal shutters 16R, 16G, 16B change relative to signal voltages as shown in FIG. 14. The whole range of changes of the transmittance represented by the curve therein is not actually used to reproduce the gradation of an image. The range of changes of the transmittance set under control is, for instance, within the signal voltage region of VH~VL shown in FIG. 14. In other words, the transmittance changes in the practically usable region of TH~TL as shown in FIG. 14.

When primary color pixel components 18R, 18G, 18B of the liquid crystal panel 12 are assumed as a unit, the color of each pixel 20 can be changed by changing the transmittance of the liquid crystal shutters 16R, 16G, 16B according to their respective video signals.

FIG. 15 is a typical structural diagram of the back light unit 14. The back light unit 14 consists of a light source 22, reflective planes 24, 26 and a diffusion plate 28. The light source 22 is generally a fluorescent lamp and it is a fluorescent lamp of a three wavelength band type in most cases.

The light emitted from the light source 22, for instance, is reflected a multiplex time from the reflective planes 24, 26 and the diffusion plate 28, led out of the surface of the diffusion plate 28 and passed through the liquid crystal shutters 16R, 16G, 16B and color filters 30R, 30G, 30B before being led out of the above-described primary color pixel components 18R, 18G, 18B.

A description will subsequently be given of a case where the chromaticity of a reference white of the pixel 20 is adjusted to, e.g., $D_{65}$. The pixel 20 consisting of primary color pixel components 18R, 18G, 18B is such that the spectral transmittance of the red, green and blue color filters 30R, 30G, 30B have characteristics corresponding to the curves 111, 112 and 113 as shown in FIG. 16.

The relative value of the transmittance of the liquid crystal shutter 16B of the blue pixel component 18B is assumed 100 when spectral power distribution of the luminous surface of the back light unit 14 is $S_1$ as shown by a solid line of FIG. 16.

In the case of spectral power distribution $S_2$ shown by a broken line of FIG. 16 where the energy on the shorter wavelength region is high, the relative value of the transmittance of the liquid crystal shutter 16B of the blue pixel component 18B has to be set at 70.

FIG. 17 is a graph illustrating the relation between a driving voltage for driving the liquid crystal shutter and the transmittance when the transmittance is adjusted by means of the driving voltage.

As shown in FIG. 17, the driving voltages for driving the liquid crystal shutter 16R, 16G, 16B have to be set at VR, VG, VB in accordance with the respective transmittance so that the transmittance of the liquid crystal shutters 16R, 16G, 16B becomes TR, TG, TB.

In brief, the transmittance of the liquid crystal shutters 16R, 16G, 16B of the primary color pixel components 18R, 18G, 18B have to be changed in proportion to the spectral power distribution of the luminous surface of the back light unit while the chromaticity of the reference white is adjusted. In other words, although the transmittance of one of the liquid crystal shutter 16R, 16G, 16B can be set at a maximum value TH within the range of practically usable transmittance, the transmittances of the others corresponding to of the liquid crystal shutters the other primary color pixel components have to be set lower than TH to reduce the unnecessary energy components of the corresponding wavelength bands out of the spectral distribution of the luminous surface of the back light unit. Consequently, the luminance of the reference white tends to decrease.

As shown in FIG. 14, on the other hand, the voltage of each primary color pixel component is set so that black is reproduced even in the range of signal voltages where the transmittance of the liquid crystal shutter is low. That is, the disadvantage during operation of the circuit is that ranges of signal voltages applied to the primary color pixel components to reproduce white and black are different from one other. Moreover, when a change of the transmittance by means of the driving voltage is low, the driving voltages for driving the liquid crystal shutters are actually set equal when black is reproduced. This means the range of driving voltages for driving the liquid crystal shutters at the time the shade of an image is reproduced varies with the primary color and this is disadvantageous in that the gradation levels being reproduced are different from each other.

OBJECT AND SUMMARY OF THE INVENTION

As set forth above, because the transmittance of one or two of the liquid crystal shutters 16R, 16G, 16B of the primary color pixel components 18R, 18G, 18B cannot be set up to the maximum value TH within the range of practically usable transmittance so as to conform the chromaticity of the pixel 20 to the predetermined reference white, the luminance of the reference white is lowered. In addition to the aforementioned problem that has heretofore been posed, there have been retained the following disadvantages:

The gradation levels being reproduced differ, because the range of driving voltage for driving the liquid crystal shutters varies with the primary color when the shade of an image is reproduced.

Moreover, the fact that the driving voltage for driving the liquid crystal shutter varies with the primary color when the chromaticity is conformed to the reference white is undesirable in view of circuit designing and circuit operation.

An object of the present invention is to provide a color liquid crystal display device in which the luminance of a reference white can be set high.

Another object of the present invention is to provide a color liquid crystal display device in which gradation levels being reproduced can be equalized in according with each primary color.

Still another object of the present invention is to provide a color liquid crystal display device in which the configuration of a driving circuit can be simplified.

In order to accomplish the above-described objects, when the reference white is reproduced the transmittance of liquid crystal shutters is set to be equal in consideration of the characteristics of spectral transmittance of color filters of their respective primary color pixel components. As a means for setting transmittance, adjustment may be made to, for instance, spectral power distribution of the luminous surface of a back light unit for illuminating the surface of a liquid crystal panel.

BRIEF DESCRIPTION OF THE DRAWINGS

FIGS. 5(a) and 5(b) are charts respectively showing the relation of the relative transmission factors $c_j$ (j=R, G, B) of liquid crystal shutters to the luminance of a reference white and to the luminance on the luminous surface of a back light unit;

DETAILED DESCRIPTION OF PREFERRED EMBODIMENT

Figure 1:
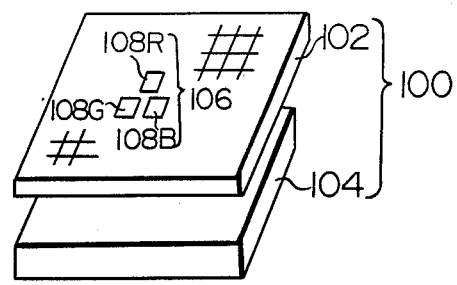
FIG. 1 is a schematic perspective view of a color liquid crystal display device.

FIG. 1 is a perspective view of a color liquid crystal display device embodying the present invention.

The color liquid crystal display device 100 shown in FIG. 1 comprises a liquid crystal panel 102 and a back light unit 104 for illuminating the liquid crystal panel 102 from behind.

Figure 2:
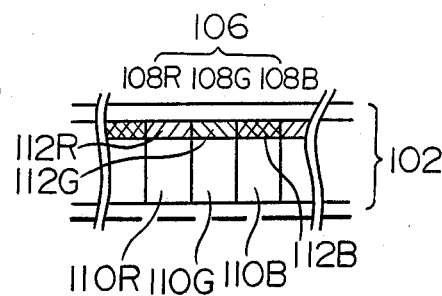
FIG. 2 is a schematic enlarged sectional view illustrating a liquid crystal panel structure.

FIG. 2 is a sectional view of the liquid crystal panel for illustrating the typical structure thereof. As shown in FIGS. 1 and 2, the liquid crystal panel 102 has a number of horizontal and vertical pixels 106. Each pixel 106 is composed of red, green and blue primary color pixel components 108R, 108G and 108B.

The primary color pixel components 108R, 108G and 108B are provided with liquid crystal shutters 110R, 110G and 110B, and color filters 112R, 112G, 112B corresponding to primary colors, respectively.

Figure 3:
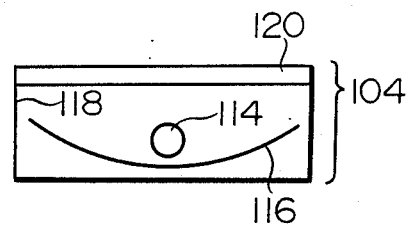
FIG. 3 is a schematic sectional view of a back light unit.
Figure 4:
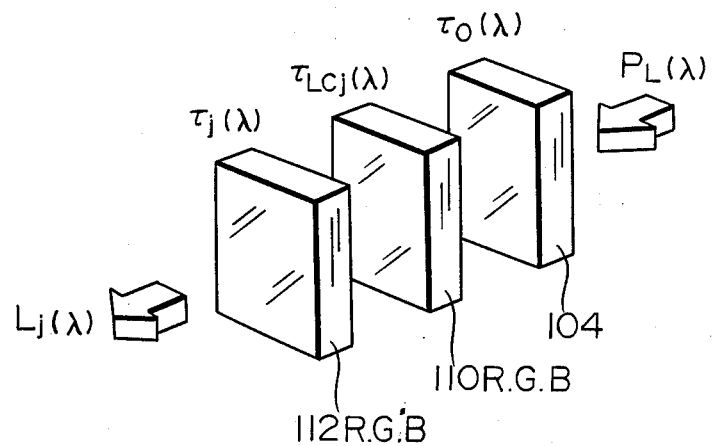
FIG. 4 is a diagram illustrating the relation between the spectral power distribution of the light derived from a back light source and the spectral power distribution of the light emitted from primary color pixel components j (j=R, G, B) using a schematic perspective view of part of a liquid crystal display device.

FIG. 3 is a schematic sectional view of the back light unit 104 for illustrating the typical construction thereof. As shown in FIG. 3, the back light unit 104 consists of a light source 114, reflective planes 116, 118 and a diffusion plate 120.

Three primary color fluorescent materials are blended and applied to a fluorescent lamp as the light source 114. The spectral power distribution of the fluorescent lamp as the light source 114 is arranged so that the transmittance of the liquid crystal shutters 110R, 110G, 110B are set equal when a predetermined reference white is reproduced.

In concrete terms, the transmittance are set as follows:

Given that spectral power distribution is $P_i(\lambda)$ (i=r, g, b) when the primary color fluorescent materials are respectively applied, $$P_L(\lambda) = \epsilon e_i P_i(\lambda) \quad (i=r, g, b,) \tag{1}$$

provided that the luminescence of primary color fluorescent materials are assumed to be of a complete additive mixture in the lamp to which the blend has been applied;

Where $e_i$ represents the ratio of the ultraviolet-ray exciting energy received by the respective primary color fluorescent materials, and thus $$\epsilon e_i = 1 \tag{2}$$

(hereinafter referred to as the energy distribution coefficient).

The spectral radiance $L_j(\lambda)$ of the primary color pixel j (j=R, G, or B) can be expressed as $$L_j(\lambda) = K_1 \tau_j(\lambda) \tau_{LCj}(\lambda) \tau_0(\lambda) P_L(\lambda) \quad (j=R, G, B,) \tag{3}$$

assuming that this color liquid crystal display device has the structure modeled on a typical one, where $K_1$: proportional constant; $\tau_j(\lambda)$: spectral transmittance of the color filter of the primary color pixel j; $\tau_{LCj}(\lambda)$: spectral transmittance of the liquid crystal shutter of the primary color pixel j including the characteristics of the polarizing filter, a base glass, etc.); $\tau_0(\lambda)$: overall spectral transmittance of the back light unit (including the characteristics of the reflective plate, a diffusion plate, etc.).

The so-called CIE tristimulus values $(X_j, Y_j, Z_j)$ of the primary color pixel j can be expressed by $$\begin{bmatrix} X_j \\ Y_j \\ Z_j \end{bmatrix} = \int_{380}^{780} L_j(\lambda) \begin{bmatrix} x(\lambda) \\ y(\lambda) \\ z(\lambda) \end{bmatrix} d\lambda \quad (4)$$

using CIE color matching functions $x(\lambda)$, $y(\lambda)$, $z(\lambda)$. Assuming the tristimulus values $(X_j, Y_j, Z_j)$ is expressed by $$\begin{bmatrix} X_j \\ Y_j \\ Z_j \end{bmatrix} = c_j \begin{bmatrix} X_{jo} \\ Y_{jo} \\ Z_{jo} \end{bmatrix} (0 \leq c_j \leq 1) \quad (5)$$

against the tristimulus values $(X_{jo}, Y_{jo}, Z_{jo})$ of the primary color pixel j when set at the practically usable maximum value within the range of changes of the transmittance of the liquid crystal shutter. Hereinafter $c_j$ is referred to as transmission factor.

When the ratio of the area of the aperture of the primary color pixel j is set at $a_j (\Sigma a_j = 1)$, the tristimulus values $(X_{TV}, Y_{TV}, Z_{TV})$ of the color reproduced of the pixel 106 with the three primary color pixel components 108R, 108G, 108B considered as a unit) becomes $$\begin{bmatrix} X_{TV} \\ Y_{TV} \\ Z_{TV} \end{bmatrix} = K_2 \sum_j a_j \begin{bmatrix} X_j \\ Y_j \\ Z_j \end{bmatrix} = K_2 \sum_j c_j a_j \begin{bmatrix} X_{jo} \\ Y_{jo} \\ Z_{jo} \end{bmatrix} \quad (6)$$

$$(j = R, G, B)$$

provided $K_2$ is expressed as a proportional constant. The coordinates $(x_{TV}, y_{TV})$ of the chromaticity of the color reproduced are $$\begin{bmatrix} x_{TV} \\ y_{TV} \end{bmatrix} = \frac{1}{(X_{TU} + Y_{TU} + Z_{TU})} \begin{bmatrix} X_{TV} \\ Y_{TV} \end{bmatrix} \quad (7)$$

As is obvious from Eqs. (3)~(5), the tristimulus values $(X_{jo}, Y_{jo}, Z_{jo})$ are caused to change into various values by the spectral power distribution $P_L(\lambda)$ of the back light source. This means transmission factor $c_j$ (j=R, G, B) has to be changed in proportion to the spectral power distribution $P_L(\lambda)$ of the back light source in order to conform a change of the color reproduced as shown in Eqs. (6), (7) to the chromaticity of the predetermined reference white.

Accordingly, the mixing ratio of the primary color fluorescent materials that emit red, green and blue light, respectively was altered during the process of preparing them and the transmission factor $c_j$ (j=R, G, B) was examined so that the chromaticity of the color reproduced of the aforesaid pixel 106 conforms to the reference white $D_{65}$ relative to the spectral power distribution of back light in various forms. The results obtained shows that the relation of the transmission factor $c_j$ (j=R, G, B) to the luminance of the aforesaid pixel 106 and to the luminance on the luminous surface of the back light unit 104 look like those shown in FIGS. 5(a) and 5(b), respectively. In this case, the percentage $a_j$ of the area of the aperture of the pixel j was equalized.

As shown in the charts above, the luminance of the pixel 106 is maximized at $$C_R = C_G = C_B = 1 \quad (8)$$

in other words, it is maximized when the transmittance of the liquid crystal shutters 110R, 110G, 110B of the primary color pixel components 108R, 108G, 108B become equal to the maximum value of the practically usable transmittance within the range of changes of the transmittance of the liquid crystal shutter. At this time, the luminance of the luminous surface of the back light unit 104 is not maximized.

In short, it is only neccessary to set the spectral power distribution of the light source 114 of the back light unit 104 (i.e., the spectral power distribution of the luminous surface of the back light unit 104) to maximize the luminance of the aforesaid pixel 106 in such a manner that the reference white is obtained when the transmittance of the liquid crystal shutters 110R, 110G, 110B of the primary color pixel components 108R, 108G, 108B become equal to the maximum value of the practically usable transmittance within the range of changes of the transmittance of the liquid crystal shutter.

Incidentally, given the maximum value of the practically usable spectral transmittance of the liquid crystal shutter is $\tau_{Lco}(\lambda)$, and thus, $\tau_{Lcj}(\lambda)\tau_o(\lambda)$ becomes $C_j \tau_{Lco}(\lambda)$, and Eq. (6) becomes $$\begin{bmatrix} X_{TV} \\ Y_{TV} \\ Z_{TV} \end{bmatrix} = K_1 K_2 \int_{380}^{780} \left[ \sum_i a_j c_j \tau_j(\lambda) \right] \tau_{Lco}(\lambda) P_L(\lambda) \begin{bmatrix} x(\lambda) \\ y(\lambda) \\ z(\lambda) \end{bmatrix} d \quad (9)$$

in consideration of Eqs. (3)~(5). $[\Sigma a_j c_j \tau_j(\lambda)]\tau_{Lco}(\lambda)$ in Eq. (9) corresponds to spectral transmittance of the pixel 106 with transmission factors $(C_R, C_G, C_B)$ set at given values. For this reason, the spectral transmittance of the primary color pixel components 108R, 108G, 108B have not always to be measured separately in order to set the spectral power distribution $P_L(\lambda)$ of the light source 114 for reproducing the reference white to the liquid crystal panel 102 set at $(C_R, C_G, C_B)=(1, 1, 1)$, whereas the spectral transmittance of the pixel 106, i.e., all the primary color pixel components 108R, 108G, 108B may be solely measured. In practice, the measurement of the spectral transmittance like this may be made with respect to an area considered large enough to include the exact or approximate number of primary color pixel components. Although the spectral transmittance of the liquid crystal panel 102 and the overall spectral transmittance of the back light unit may be measured separately, the spectral transmittance inclusive of both, i.e., at least the spectral transmittance $[\Sigma a_j \tau_j(\lambda)]\tau_{Lco}(\lambda)\tau_o(\lambda)$ should be measured.

When any one of the liquid crystal shutters 110R, 110G, 110B of the primary color pixel components 108R, 108G, 108B has the greatest transmission factor in connection with the spectral power distribution of the luminous surface of the back light unit 104, that transmission factor is defined as 1 and those of the remaining liquid crystal shutters of the primary color pixel components are set not less than 0.8, preferably not less than 0.9 and most preferably not less than 0.95.

What has been described above is also applicable to a case where the fluorescent material and the chromaticity of the reference white vary. When the transmission factors of the liquid crystal shutters 110R, 110G, 110B of the primary color pixel components 108R, 108G, 108B are equal, the energy distribution ratio of each fluorescent material employed to conform to the chromaticity of the pixel 106 to that of the predetermined reference white is readily obtainable from Eqs. (1)~(5). The fluorescent material mixing ratio for manufacturing a fluorescent lamp having such spectral power distribution that the chromaticity of the pixel conforms to that of the predetermined reference white can be obtained by referring to that value.

Since the spectral power distribution of the back light unit 104 is thus set in the present invention, the luminance of the reference white can be set high.

As the driving voltages for driving the liquid crystal shutters 110R, 110G, 110B, become equal in terms of three primary colors when the chromaticity of the pixel conforms to that of the reference white, desirable effects are gained in view of circuit-designing and circuit operation.

Further, the ranges of driving voltages for driving the liquid crystal shutters 110R, 110G, 110B are equal in terms of all three primary colors when the shade of an image is reproduced, so that the gradation levels being reproduced are equalized.

Figure 6:
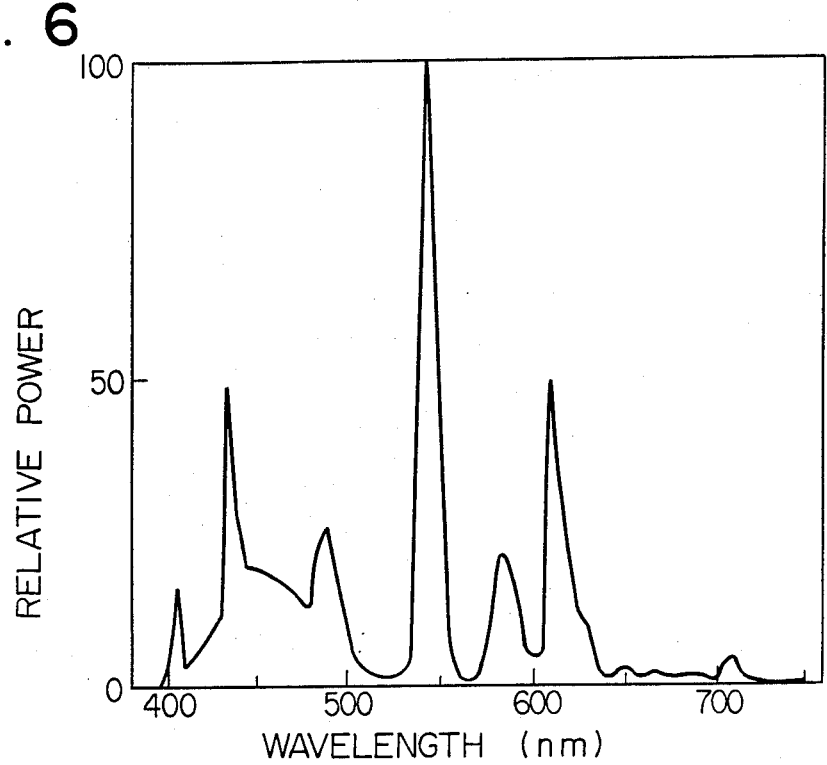
FIG. 6 is a chart showing spectral power distribution of the luminous surface of back light unit embodying the present invention.

EXPERIMENTAL EXAMPLE 1:

FIG. 6 is a chart showing spectral power distribution on the luminous surface of a back light unit as this experimental example.

Eu-activated yttrium oxide, Ce, Tb-activated lanthanum silic phosphate and Eu-activated barium magnesium aluminate were used as first, second and third luminous materials respectively and these materials were mixed together at a 39:42:19 weight ratio. The mixture was applied onto a fluorescent lamp for use as a back light source. Of two combinations of primary color filters shown in FIG. 7, the combination of a-R, a-G, a-B was arranged so that the chromaticity of the reproduced color of the liquid crystal display device conformed to that of CIE standard illuminant $D_{65}$.

The chromaticity coordinates (x, y) of three primary colors of the liquid crystal display device were then (0.61, 0.35) for red, (0.29, 0.60) for green and (0.15, 0.07) for blue and an image having good reproduced colors which were by no means inferior to those on any ordinary color CRT television were obtained.

Figure 8:
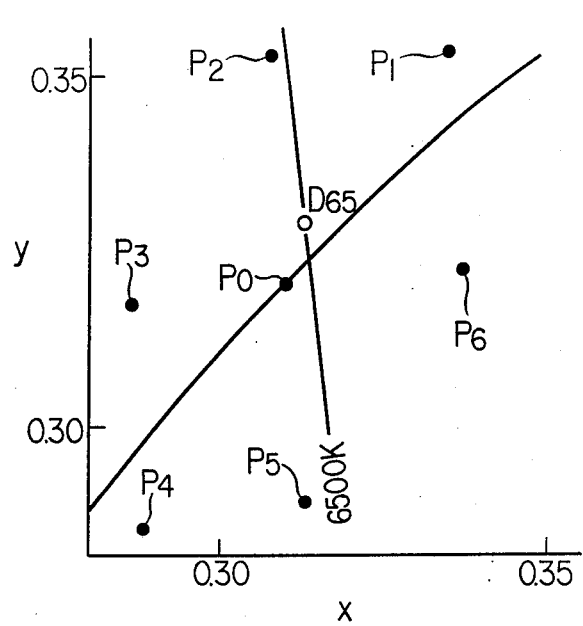
FIG. 8 is a graph showing the relation between the chromaticity $D_{65}$ of the reference white and various sorts of chromaticity on the luminuous surface of the back light unit.

With respect to the luminance of a reference white, given a relative value of the luminance was 100 when the luminous surface of a back light unit in this experimental example with a point Po of chromaticity shown in FIG. 8, chromaticity other than this, i.e., the luminance set at points $P_1 \sim P_6$ of FIG. 8, was 76.5, 86.1, 78.1, 90.4, 80.7, 88.5 at the respective points and proved lower than what had been decided by the method of the present invention in every case.

Figure 7:
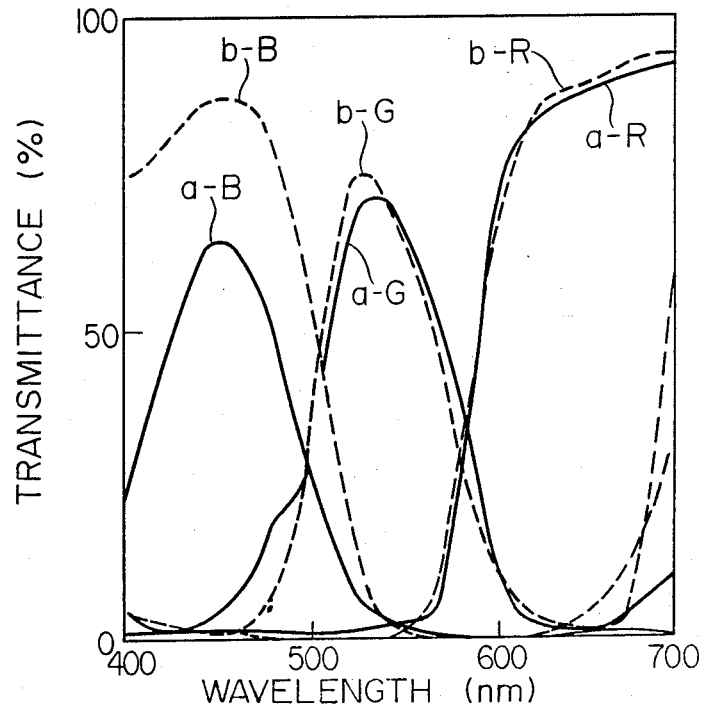
FIG. 7 is a chart showing examples of the spectral transmission factors of color filters of the primary color panel pixel components.
Figure 9:
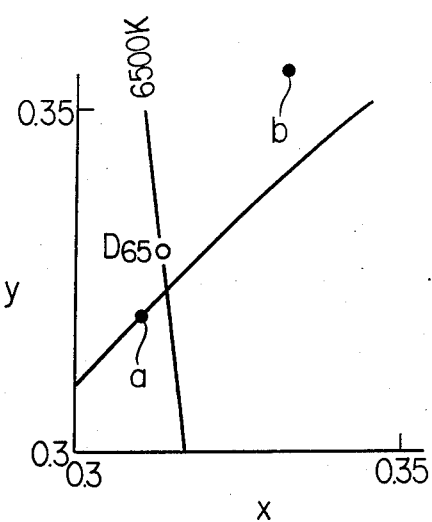
FIG. 9 is a graph showing the relation between the chromaticity $D_{65}$ of the reference white and the chromaticity of the luminuous surface of a back light unit as an experimental example of the present invention.

Moreover, the relation between the chromaticity of the luminous surface of the back light unit set in each of the two combinations of primary color filters shown in FIG. 7, namely, the first combination of a-R, a-G, a-B and the second combination of b-R, b-G, b-B is related to the chromaticity $D_{65}$ of the reference white as shown in FIG. 9. Of the two kinds of combinations of the color filters, the three luminous materials were mixed at a 36.6: 50: 13.4 weight ratio in a back light fluorescent lamp set for the second combination.

As is obvious from the description above, the chromaticity of the luminous surface of the back light unit:
(1) does not (always) conform to the chromaticity of the reference white; and
(2) has to be changed in proportion to changes of characteristics of the transmittance of the primary color filter.

Apparently, the spectral power distribution of the luminous surface of the back light unit should be set after all in conformity with the characteristics of the transmittance of the primary color filter because the chromaticity changes with the spectral power distribution.

Figure 10:
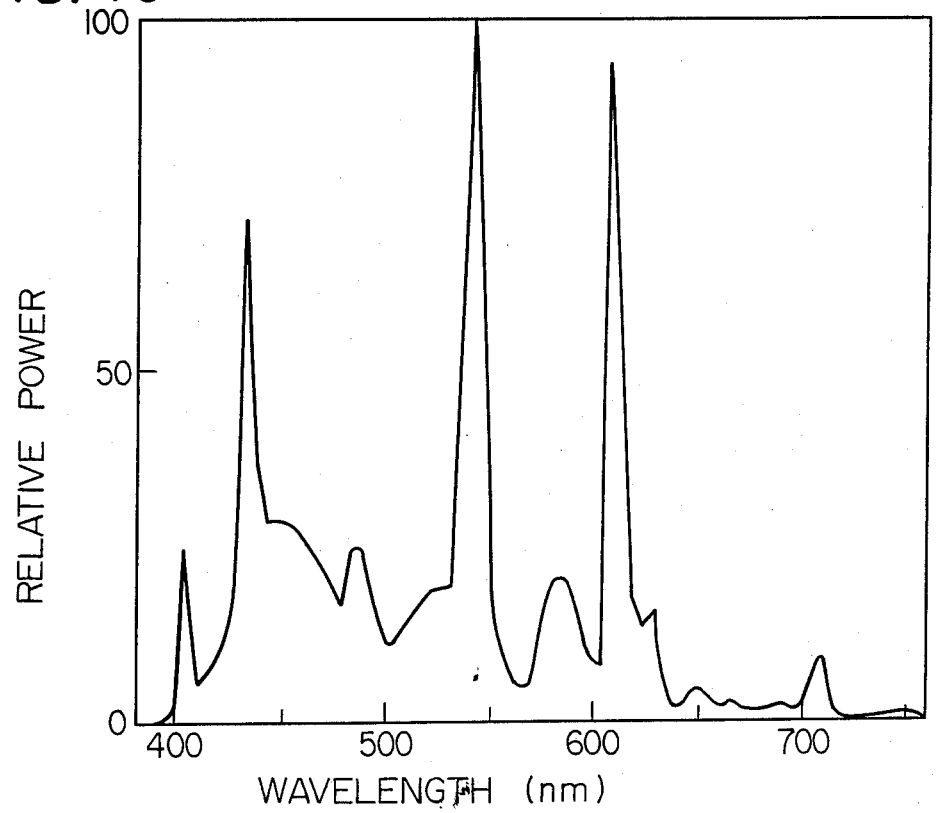
FIG. 10 is a chart showing spectral power distribution of the luminuous surface of a back light unit as another experimental example of the present invention.

EXPERIMENTAL EXAMPLE 2:

FIG. 10 is a chart showing spectral power distribution of the luminous surface of a back light unit as this experimental example.

Eu-activated yttrium oxide, Tb-activated lathanum silic phosphate, Eu-activated barium magnesium aluminate and Mn-activated zinc silicate were used as first, second, third and fourth luminous materials respectively and these materials were mixed together. The mixture was applied onto a fluorescent lamp for use as a back light source. Of two combinations of primary color filters shown in FIG. 7, the combination of a-R, a-G, a-B was arranged so that the chromaticity of the reproduced color of the liquid crystal display device conformed to that of CIE standard illuminant $D_{65}$.

The luminance of the luminous surface of a back light unit in this case and the luminance shown when the reproduced color of the liquid crystal display device conformed to the reference white were slightly reduced to 96.1, and 96.5 respectively and compared with the luminance in the first experimental example which was set as 100. However, the chromaticity coordinates (x, y) of three primary colors of the liquid crystal display device were then (0.62, 0.35) for red, (0.27, 0.61) for green and (0.15, 0.07) for blue and an image having good reproduced colors particularly with the excellent color purity of red and green primary colors.

Figure 11:
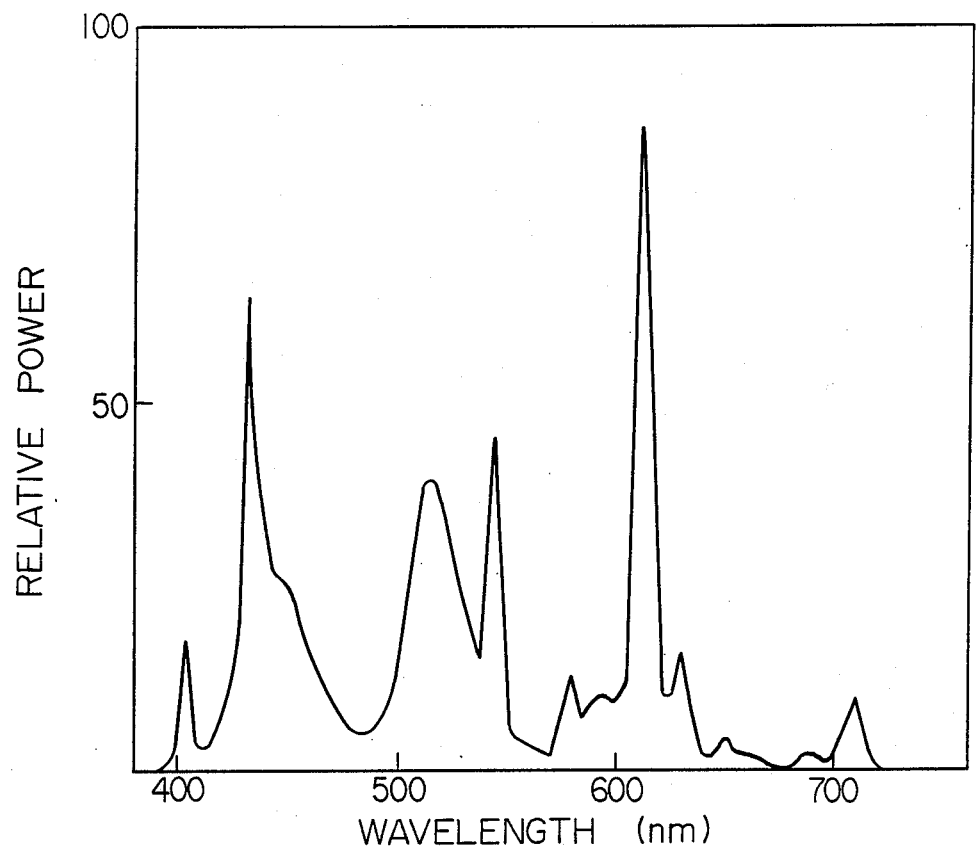
FIG. 11 is a chart showing spectral power distribution of the luminous surface of a back light unit as still another experimental example of the present invention.
Figure 12:
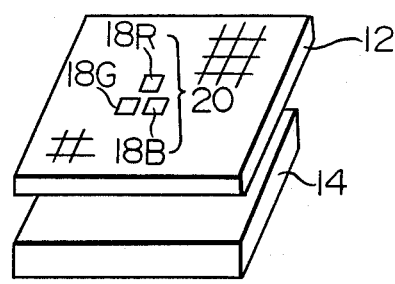
FIG. 12 is a schematic perspective view of a color liquid crystal display device.
Figure 13:
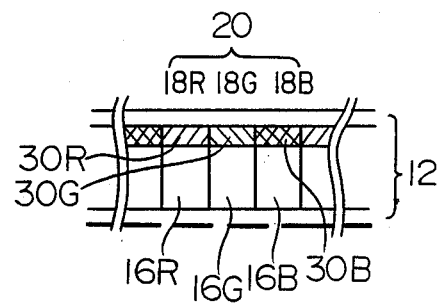
FIG. 13 is a schematic enlarged sectional view of a liquid crystal panel structure.
Figure 14:
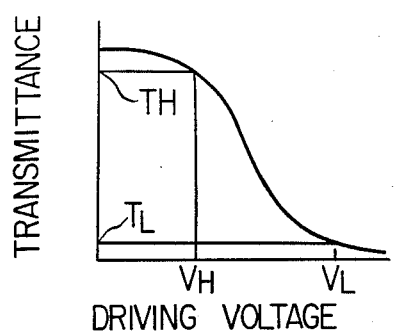
FIG. 14 is a graph showing the relation in general between a driving voltage for driving liquid crystal and a transmittance.
Figure 15:
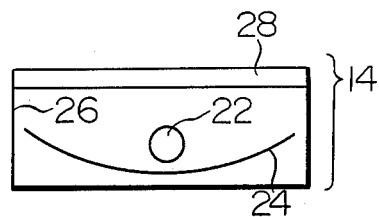
FIG. 15 is a schematic sectional view illustrating the construction of a back light unit.
Figure 16:
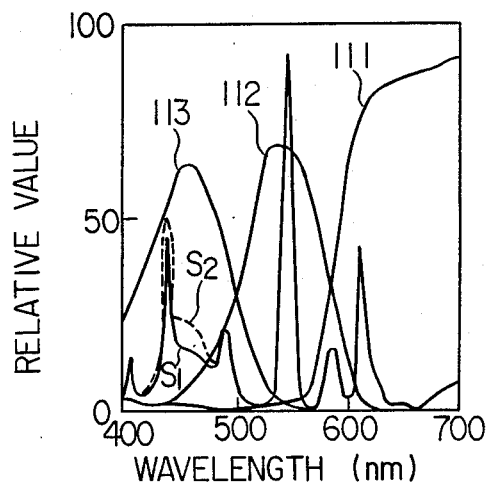
FIG. 16 is a chart showing the relation between the spectral transmittance of color filters of primary color pixel components and two kinds of spectral power distribution of the luminous surface of the back light unit.
Figure 17:
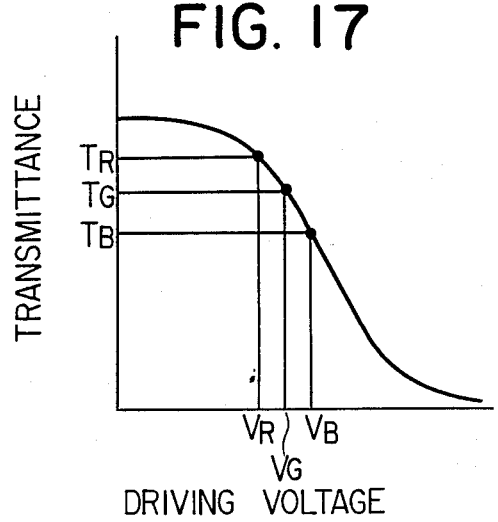
FIG. 17 is a graph showing the relation between the driving voltage and the transmittance in terms of their primary colors when the color reproduced on the liquid crystal display device is set to the reference white.

EXPERIMENTAL EXAMPLE 3:

FIG. 11 is a chart showing spectral power distribution of the luminuous surface of a back light unit as this experimental example.

Eu-activated yttrium oxide, Eu, Mn-activated barium magnesium aluminate and Eu-activated strontium chloroapatite were used as first, second and third luminous materials respectively and these materials were mixed together. The mixture was applied onto a fluorescent lamp for use as a back light source. Of two combination of a-R, a-G, a-B was arranged so that the chromaticity of the reproduced color of the liquid crystal display device conformed to that of CIE standards illuminant $D_{65}$. The three materials were mixed at a 50.3: 29.6: 20.1 weight ratio for the back light fluorescent lamp.

The coordinates (x, y) chromaticity of three primary colors of the liquid crystal display device were then (0.63, 0.34) for red, (0.23, 0.64) for green and (0.15, 0.08) for blue and an image having good reproduced colors particularly with the excellent color purity of green primary color.

The application of the present invention is not limited to those experimental examples and it will be understood by those skilled in the art that the foregoing and other changes in form and details can be made therein without departing from the spirit and scopes of the invention.

Although a description has been given of a case where the chromaticity of the reference white is conformed to that of CIE standard illuminant $D_{65}$ in the above-described experimental examples, the present invention is also applicable to another case where the former is made to conform to other kinds of chromaticity, i.e., $D_{43}$.

In the experimental examples above, a reference has been made to the use of the fluorescent lamp as a back light source prepared by mixing three and four kinds of fluorescent materials and applying the mixture to the fluorescent lamp, wherein the fluorescent materials for use are selected among from those having the principal energypeak in red, green and blue wavelength regions in order that the color purity of three primary colors is increased. As such fluorescent materials, use can be made of, e.g., Mn-activated magnesium phlorogermanate for red or Eu-activated yttrium oxysulfide. These materials may be chosen in consideration of the luminance when the chromaticity of the pixel is made to conform to the reference white and of the chromaticity of three primary colors.

Further a combination of inexpensive fluorescent materials of Ca-halophosphate may be used for the purpose.

The number of fluorescent materials being mixed and applied may be larger or smaller than what has been referred to in the aforesaid experimental examples on condition that spectral power distribution can be set in line with the spirit of the present invention.

As for the light source, use can also be made of any one of those in different luminous forms or made of different luminous materials such as tungsten-filament lamps, halogen lamps, electric bulbs, high intensity discharge lamps or light sources employing electroluminescent materials.

Moreover, color filters may be combined with the light source as occasion demands to set the spectral power distribution of the back light in conformity with the spirit of the present invention.

With respect to the construction of the color liquid crystal display device, the back light unit may be incorporated in the liquid crystal panel or made detachable therefrom.

In implementing the present invention, what is solely required is that the spectral power distribution (and therefore chromaticity) of the back light source is set so that the reference white is available when the back light unit is combined with the liquid crystal panel set in such a manner as to equalize the transmittance of the primary color pixel components and the setting thereof can be done independently of the chromaticity of the reference white, the type of the light source, the construction of the back light unit and the structure of the liquid crystal panel.

What is claimed is:

1. A color liquid crystal display device for displaying a color image comprising:
    a back light unit having
        a light source,
        at least one reflective plane, and
        a diffusion plate; and
    a liquid crystal panel disposed adjacent the back light unit and receiving light from the back light unit, the liquid crystal panel having a plurality of pixels aligned horizontally in rows and vertically in columns, each of the pixels including at least three pixel components each corresponding to a different primary color, and
    a plurality of liquid crystal shutters each corresponding to one of the pixel components for controlling transmission of light from the back light unit to the pixel components of each of the pixels in response to a driving voltage such that spectral transmittances of the liquid crystal shutters corresponding to each of the pixels are set initially to a substantially equal value to produce a reference white visual output.

2. A color liquid crystal display device according to claim 1, further including a plurality of color filters, each corresponding to a different one of the pixel components and disposed adjacent a corresponding liquid crystal shutter for adjusting spectral power distribution of light received from the back light unit.

3. A color liquid crystal display device according to claim 2, wherein the light source of the back light unit includes a fluorescent lamp having a fluorescent mixture of at least three different kinds of fluorescent materials blended at a predetermined ratio for generating a spectral power distribution of light whereby said spectral transmittances of the liquid crystal shutters are set to a substantially equal value.

4. A color liquid crystal display device according to claim 3, wherein the fluorescent mixture includes Eu-activated yttrium oxide, Tb-activated lathanum silic phosphate, and Eu-activated barium magnesium aluminate.

5. A color liquid crystal display device according to claim 4, wherein the fluorescent mixture further includes Mn-activated zinc silicate.

6. A color liquid crystal display device according to claim 3, wherein the fluorescent mixture includes Eu-activated yttrium oxide, Eu, Mn-activated barium magnesium aluminate, and Eu-activated strontium chloroapatite.

7. A method of displaying a color image on a liquid crystal panel having a back light unit disposed adjacent the liquid crystal panel and having a plurality of pixels aligned horizontally in rows and vertically in columns each of the pixels including at least three pixel components each corresponding to a different primary color, and a plurality of liquid crystal shutters each corresponding to each of the pixel components, comprising the steps of:
    initially setting spectral transmittances of the liquid crystal shutters corresponding to each of the pixels to a substantially equal value to produce a reference white visual output; and
    controlling transmission of light received from the back light unit to the pixel components of each of the pixels.

8. The method of claim 7, wherein the step of setting the spectral transmittances of the liquid crystal shutters to a substantially equal value includes the substep of adjusting spectral power distribution of the back light unit.

9. The method of claim 7, wherein the step of setting the spectral transmittances of the liquid crystal shutter to a substantially equal value includes the substep of ensuring that said spectral transmittances are greater than or equal to 0.8 and less than or equal to 1.

* * * * *